United States Patent [19]
Campbell

[11] 3,738,740
[45] June 12, 1973

[54] SUN REFLECTOR

[76] Inventor: Graham S. Campbell, 6003 Oakhill Drive, Salt Lake City, Utah 84121

[22] Filed: July 3, 1972

[21] Appl. No.: 268,821

[52] U.S. Cl.................. 350/288, 350/292, 350/310
[51] Int. Cl. ............................................ G02b 5/08
[58] Field of Search ................ 350/288, 299, 310, 350/293, 294, 292

[56] References Cited
UNITED STATES PATENTS
3,635,547  1/1972  Rushing............................. 350/288
3,552,835  1/1971  Benzies............................. 350/288

OTHER PUBLICATIONS
Isaacs, "A Modern Bowl For Sun Bathing," Popular Science, Vol. 196, No. 2, Feb. 1970, pp. 112, 113, 130.

Primary Examiner—William L. Sikes
Assistant Examiner—Michael J. Tokar
Attorney—B. Deon Criddle and M. Reid Russell

[57] ABSTRACT

A sun reflector composed of an upstanding frame that supports a flexible and portable sun reflector or solarium structure. The frame is collapsible and the reflector structure folds to allow the sun reflector to be easily stored and transported. The reflector structure is provided with a dark, heat absorbing and retaining outer surface, and a light sun reflective inner surface and floor. When in use, the sun reflector is positioned to expose the reflector interior and floor to direct sunlight entering through an open frontal area such that a sun bather positioned on the reflector floor is exposed to both direct and reflected sunlight.

10 Claims, 6 Drawing Figures

PATENTED JUN 12 1973 3,738,740

SUN REFLECTOR

BRIEF DESCRIPTION OF THE INVENTION

1. Field of the Invention

This invention relates to devices for reflecting and focusing rays from the sun onto portions or all of the body of a sun bather.

2. Prior Art

As shown in U.S. Pat. No. 3,463,577, sun reflecting devices, for use by a sun bather, have usually involved a reflective board, or similar structure which a user arranges next to his body so as to reflect sunlight thereon. These structures do not form a sufficiently enclosed structure that they will provide a privacy partition or a wind protector and as a result they do not hold heat and are not suitable for use at such diverse locations as pool sides, beaches and ski resorts, even when weather conditions are not ideal for sun bathing. While some tent structures, such as that shown in U.S. Pat. No. 3,244,186, have involved utilization of sun absorbent and reflective materials in their construction this has been for the purpose of providing a heating and/or cooling of the tent interior and the reflective materials have been used as part of the tent exterior surfaces.

SUMMARY OF THE INVENTION

It is a principal object of the present invention to provide a sun reflector that will serve as a privacy partition and afford protection from the elements while capturing and focusing sun rays to a user.

Other objects are to provide a sun reflector having heat absorbent and retaining outer surfaces and sunlight reflective inner surfaces arranged to focus sunlight directed thereon.

Still other objects are to provide a sun reflector which is light in weight, and that can be simply constructed from inexpensive flexible sheeting and framing materials, and that can be collapsed to present minimum dimensions for easy storage and transport.

Principal features of the present invention include a frame, preferably constructed from lightweight tubular materials, and made up of frame sections or individual poles arranged to be collapsible together. A flexible sheet material reflector, which in use resembles a three sided tent having a large open frontal area and a covered floor, is provided. Interconnected upstanding walls, having a common apex, are suspended from the frame such that when the frame sections or individual poles are collapsed together, the reflector will fold therebetween.

The reflector has a sun absorbent material on an outer surface and a light reflective material as an inner surface. The inner walls of the sun reflector, when positioned to admit sunlight through the open frontal area focus incoming sunlight onto the reflector floor whereon a sun bather positions and exposes that part of his body he wishes affected by the direct and reflected sunlight.

Additional objects and features of the invention will become apparent from the following detailed description, taken together with the accompanying drawings.

THE DRAWINGS

FIG. 1 is a perspective view of an erected sun reflector of the invention showing the interior and one outer side wall;

FIG. 2, a view of the frame sections of the sun reflector collapsed together and folding the walls of the sun reflector therebetween;

FIG. 3, a rear elevation view of the sun reflector of FIG. 1;

FIG. 4, a perspective view like that of FIG. 1, of an erected sun reflector of the invention showing another embodiment of a reflector frame structure;

FIG. 5, an enlarged, fragmentary perspective view of the upper portion of the sun reflector of FIG. 4; and FIG. 6, a perspective view like that of FIG. 1, of an erected sun reflector of the invention showing still another embodiment of a reflector frame structure.

DETAILED DESCRIPTION

Figure 1:
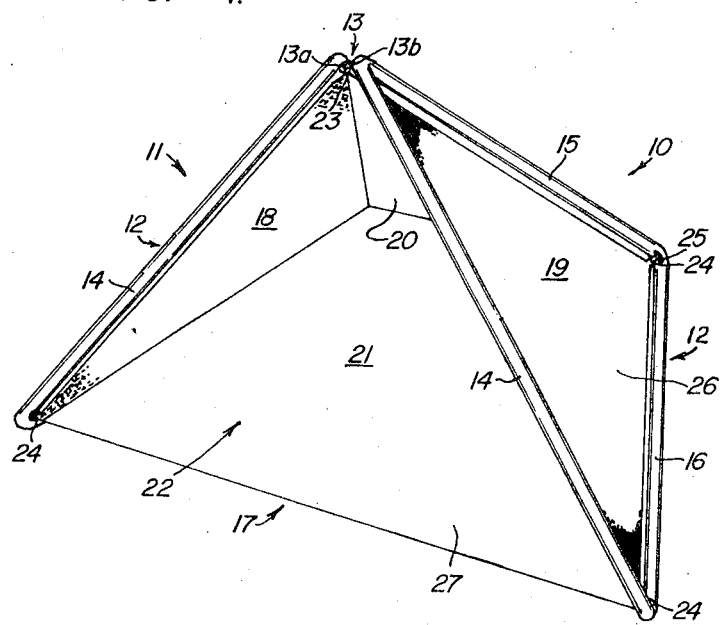
Figure 2:
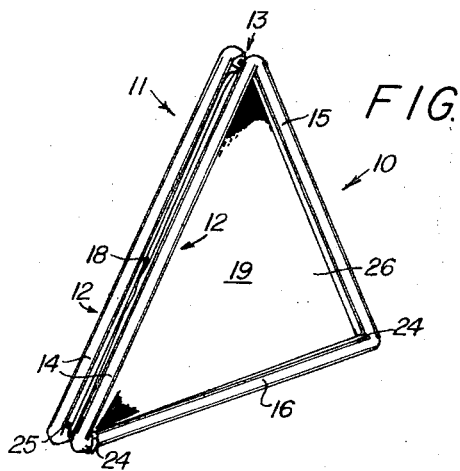
Figure 3:
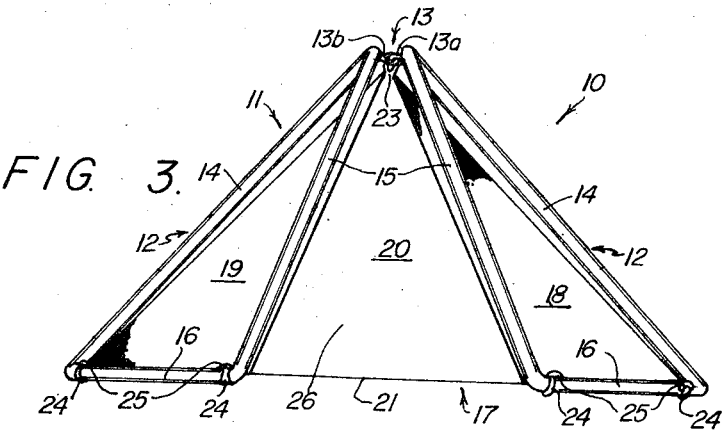

In the illustrated preferred embodiment of the invention shown in FIGS. 1-3, the sun reflector, shown generally at 10, has a frame 11 made up of two identical triangular frame sections 12, that are connected at their apexes by a coupling 13. Coupling 13 includes rings 13a and 13b, each respectively fixed to a frame section and interlooped so that the frame section can be rotated together. Each triangular frame section 12 has essentially equal sides 14 and 15 and a bottom web 16.

A reflector 17, arranged between the frame sections, is essentially a three sided tent having upstanding triangular side walls 18 and 19 and triangular back wall 20. The side edges of each side wall are fully sewed or otherwise connected to one side edge of the back wall. The reflector 17 also includes a floor 21 of generally trapezoidal configuration. One rear edge of the floor is sewed or otherwise fully connected to the base edge of the rear wall and the non-parallel side edges of the floor are each sewed or otherwise fully connected to the base edges of a side wall. A large open frontal area 22 is thus formed between the front edges of the side walls and floor. Cords 23, that are connected to either or both rings 13a and 13b of coupling 13, support the reflector 17 from above. The base corners of the reflector 17, at or near the corners of the floor, have cords 24 fixed thereto. The ends of cords 24 are tied together through appropriate eyelets 25 that are formed near to the junctions of web 16 with the frame section sides 14 and 15.

The outer surface 26 of the tent structure 17 is darkly colored and is formed from a material having good heat absorption and retention characteristics. A light reflective material forms the inner surface 27 of the reflector 17 and is sewed or otherwise affixed to the outer surface 26 to present an interior that reflects sunlight entering through the open frontal area 22. The reflective inner surfaces of walls 18 and 19 and back wall 20 are arranged to focus entering sunlight onto the floor 21. The floor 21 also has a reflective inner surface that reflects and focuses direct sunlight striking thereon to the body of a sun bather lying within the reflector 10.

The connection coupling 13 allows the frame sections 12 to be rotated inwardly against each other, folding the flexible reflector 17 therebetween.

Figure 4:
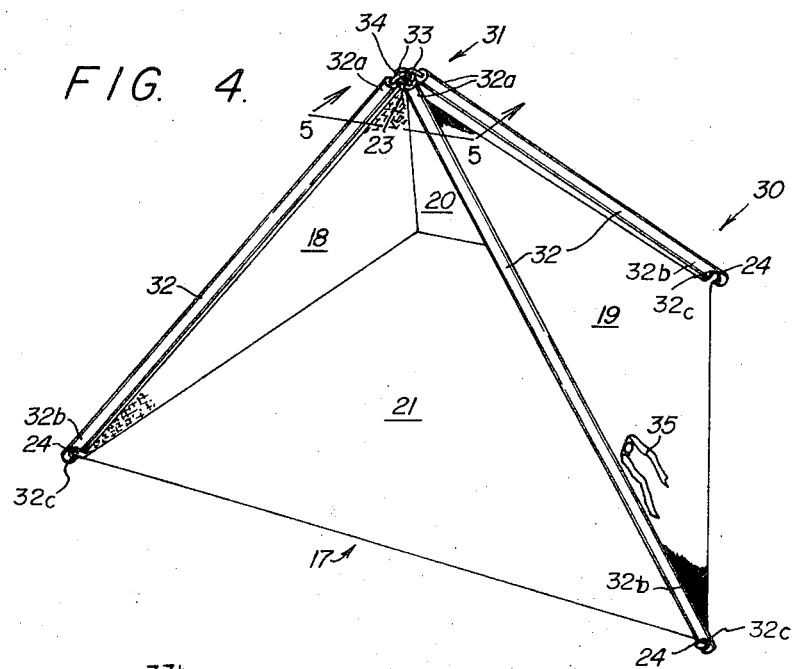
Figure 5:
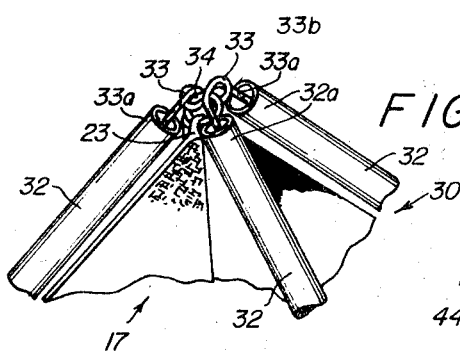

Another embodiment of a sun reflector, shown at 30 in FIGS. 4 and 5, incorporates the reflector 17 already described in the previous embodiment. The sun reflector 30, however, uses four upright poles 32, rather than two frame sections 12 as in the previous embodiment, to form its frame 31. Poles 32 are divided into pairs connected at their top ends 32a by the legs 33a of a large torsion spring 33, which torsion spring legs are each inserted into top ends of the pair of poles 32. Torsion springs 33 bias the bottom ends 32b of the poles 32 apart. A link 34 is connected through the open coils 33b of the torsion springs and joins the two pairs of poles at their apexes. The poles, when spread, thus form the sides of a pyramid.

The reflector 17 is suspended from the frame 31 by respectively connecting reflector cords 23 through the link 34 and reflector cords 24 through holes 32c formed near the ends of poles 32 opposite to torsion springs 33. The construction and dimensions of the reflector floor 21 and side walls limit the extent of spreading of the pole ends away from one another. The torsion springs hold the legs apart to stretch taut the side walls 18 and 19 and triangular back wall 20 of reflector 17.

Link 34 allows the pairs of poles to be collapsed together and the spring action of torsion spring 33 can be overcome by an operator to collapse together, into a bundle, the poles 32 with the reflector 17 folding therebetween. A strap 35 is tied around the bundle of poles and reflector to hold them together against the biasing of torsion springs 33. It can be seen that the sun reflector 30 is readily transported or stored in a collapsed state, and it should be apparent that poles 32 could be constructed in sections or made to fold upon themselves, to further reduce the dimensions of such a sun reflector to further facilitate handling and storage thereof.

Figure 6:
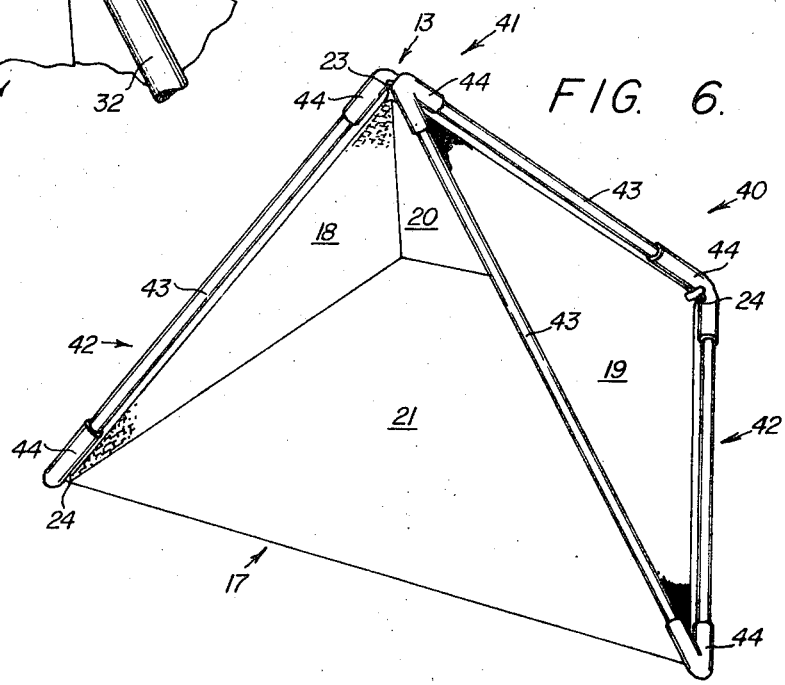

Still another embodiment of a sun reflector, shown at 40 in FIG. 6, also incorporates the reflector 17, previously described. However, unlike previously disclosed embodiments, the sun reflector 40 uses two frame sections 42 that are individually assembled from center connectors 43 that are telescoped into the open ends of tubular frame corners 44. The individual frame sections 42 are preferably linked at their apexes by a coupling 13 of the type previously shown and described, to form the sun reflector frame 41. The connectors 43 are somewhat flexible, and are positioned to be bowed slightly outwardly when inserted into opposite frame corners 44. The bowed feature of the individual connectors stretches the sides of the reflector 17 which is connected by cords 23 and 24 or the like, from its corners and apex to the frame corners 44 and holds the frame solidly together.

The extent to which the individual connectors can be inserted into the open ends of the tubular frame corners 44 is limited by the angular construction of the frame corners. The sun reflector 40 can be collapsed in the same manner as the sun reflector 10 of FIGS. 1-3, and can be disassembled by unfastening the reflector 17 from the frame 41, and withdrawing the telescoped connectors 43 from the frame corners 44.

The sun reflectors 10, 30 or 40 are each arranged for use by spreading apart a frame section 12 thereof until the floor 21 of the tent structure is tautly stretched. So erected, the reflector is positioned such that the open frontal wall area 22 faces the sun. In this attitude, webs 16 or the bottom ends 32b of poles 32 are placed on the ground, and the reflector 10 is ready for use. Sunlight strikes the slanted inner surfaces 27 of the walls and is focused downward onto bottom 21, or onto a sun bather positioned thereon. The reflective surface of bottom 21 also reflects light striking thereon either onto the body of the sun bather or back onto the walls to again be reflected onto the bottom 21. Most of the light that enters the sun reflector 10 therefor eventually strikes the body of the sun bather therein. The slant of the reflector upstanding sides and back of the reflector focus reflected sunlight onto a central part of the bottom 21, and reflects light coming therefrom. The heat absorbing characteristics of the outer surface of the reflector insures warmth inside the reflector even when used in cool climates or on marginal sun bathing days. To be of significant value on such days the reflector must also be positioned such that the opening 22 is on the side of the reflector opposite that from which wind is coming. The complete seal between wall, back and floor (which may all be of one piece of material) prevents wind from passing through the reflector to chill a user.

A sun bather using the sun reflector can thereby appreciably compound or multiply the amount of sunlight to which he is exposed. Consequently, a faster and more even tan can thereby be obtained in the reflector than is possible by sun bathing in a normal manner.

Although a preferred form of my invention has been herein disclosed, it is to be understood that the present disclosure is made by way of example and that variations are possible without departing from the subject matter coming within the scope of the following claims, which subject matter I regard as my invention.

I claim:

1. A sun reflector comprising
   an upstanding frame;
   a flexible sheet material reflector having triangular side walls connected at their sides to a triangular back with a floor interconnecting lower edges of the side walls and back, an open frontal area formed between said side walls and said bottom, said reflector having a dark heat absorbing outer surface and a light sunlight reflective inner surface; and
   means for suspending said reflector from said upstanding frame.

2. A sun reflector as recited in claim 1, wherein
   the upstanding frame is composed of a pair of triangular frame sections which are coupled together at their apexes by pivot means, whereby the base of the frame sections may be spread.

3. A sun reflector as recited in claim 2, wherein
   the frame sections are constructed from tubular members.

4. A sun reflector as recited in claim 2, wherein the pivot means comprises
   a ring connected to the apex of each frame section, said rings being interlooped.

5. A sun reflector as recited in claim 1, wherein the upstanding frame is composed of
   pairs of upstanding poles; and
   linked spring means connecting together and biasing apart the poles of each pair, whereby the bottom ends of said pairs of upstanding poles are resiliently spread apart and the pairs form a pyramid of upstanding poles.

6. A sun reflector as recited in claim 5, wherein the linked spring means consists of
   torsion springs each having two legs extending from an open torsion spring coil, and each leg connected to the top end of one of the pair of poles; and
   a continuous link connected through said open coil of each said torsion springs, connecting said pairs of poles at their apexes.

7. A sun reflector as recited in claim 1, wherein
the side walls and back of the reflector are interconnected at a peak;
the floor is formed of polygonal configuration having its non-parallel sides connected to the walls a short parallel side connected to the back and the long parallel side at the open area.

8. A sun reflector as recited in claim 1, wherein the means for suspending the reflector from said upstanding frame consists of
cords that extend from said reflector apex and from the junctions of the reflector wall edges with the reflector floor to the upstanding frame.

9. A sun reflector as recited in claim 1, wherein the upstanding frame consists of a pair of triangular frame sections each of which includes
three hollow ended angular frame corners; and
three elongate connector members whose ends are adapted to be telescoped within said frame corners to form a triangular frame section that can be disassembled.

10. A sun reflector as recited in claim 9, wherein the connector members are slightly bowed.

* * * * *